(12) United States Patent
Wiening

(10) Patent No.: US 9,132,947 B2
(45) Date of Patent: Sep. 15, 2015

(54) SEALING DISK FOR INDUCTION SEALING A CONTAINER

(75) Inventor: Heinz-Rudolf Wiening, Alfeld (DE)

(73) Assignee: Alfelder Kunststoffwerke Herm. Meyer GmbH, Alfeld/Leine (DE)

( * ) Notice: Subject to any disclaimer, the term of this patent is extended or adjusted under 35 U.S.C. 154(b) by 12 days.

(21) Appl. No.: 13/993,867

(22) PCT Filed: Nov. 29, 2011

(86) PCT No.: PCT/EP2011/071273
§ 371 (c)(1),
(2), (4) Date: Aug. 1, 2013

(87) PCT Pub. No.: WO2012/079971
PCT Pub. Date: Jun. 21, 2012

(65) Prior Publication Data
US 2015/0034643 A1     Feb. 5, 2015

(30) Foreign Application Priority Data
Dec. 14, 2010    (DE) .......................... 10 2010 054 494

(51) Int. Cl.
*B65D 51/20* (2006.01)
*B32B 7/06* (2006.01)
*B32B 7/10* (2006.01)
*B65D 53/08* (2006.01)

(52) U.S. Cl.
CPC . *B65D 51/20* (2013.01); *B32B 7/06* (2013.01); *B32B 7/10* (2013.01); *B65D 53/08* (2013.01); *B65D 2231/02* (2013.01)

(58) Field of Classification Search
CPC ...... B65D 1/20; B65D 53/08; B65D 2231/02; B32B 7/06; B32B 7/10
USPC ............ 220/359.1, 359.2, 359.3, 359.4, 260, 220/265, 266, 269, 270; 215/232, 250
See application file for complete search history.

(56) References Cited

U.S. PATENT DOCUMENTS

| 3,973,719 | A  | * | 8/1976 | Johnson et al. ................ 229/5.6 |
| 4,735,335 | A  | * | 4/1988 | Torterotot .................... 220/270 |
| 7,740,730 | B2 | * | 6/2010 | Schedl et al. ................ 156/290 |
| 2007/0007229 | A1 | * | 1/2007 | Yousif .......................... 215/232 |

FOREIGN PATENT DOCUMENTS

| CA | 2 179 840 | 12/1997 |
| DE | 37 06 962 | 9/1987 |

(Continued)

*Primary Examiner* — Robert J Hicks
*Assistant Examiner* — Kareen Rush
(74) *Attorney, Agent, or Firm* — Salter & Michaelson

(57) ABSTRACT

A sealing disc (10) is used for closing orifices of containers (5). It has a film (20) for inductively coupling heat into the sealing disc (10). A sealing layer (25) is provided on that side of the film (20) which is intended to face the interior of the container (5) in order to seal, in sealtight fashion, the sealing disc (10) on the orifice of the container (5). Lines of weakness (26) are provided in the sealing layer (25) so as to form a removal opening (27) once the film (20) has been drawn off. One or more layers (40), which are connected detachably to the film (20), are provided on that side of the film (20) which is remote from the sealing layer (25). The layers (40) detach mare easily from the lam (20) than the sealing layer (25) and also detach more easily from the orifice of the container (5) than the sealing layer (25). The layers (40) are formed such that said layers tightly close the removal opening (27) once the film (20) has been drawn off and the layers (40) have been placed onto the sealing layer (25) again.

23 Claims, 2 Drawing Sheets

(56) References Cited

FOREIGN PATENT DOCUMENTS

| | | |
|---|---|---|
| DE | 197 07 007 | 8/1998 |
| EP | 0 668 221 | 8/1995 |
| EP | 0 697 345 | 2/1996 |
| EP | 0 717 710 | 6/1996 |
| EP | 1 181 217 | 2/2002 |
| GB | 2 142 911 | 1/1985 |
| WO | 2008/006123 | 1/2008 |
| WO | 2009/155630 | 12/2009 |

* cited by examiner

SEALING DISK FOR INDUCTION SEALING A CONTAINER

FIELD OF THE INVENTION

The invention relates to a sealing disk for the closing of orifices of containers, having a foil or film for inductively coupling heat into the sealing disk, having a sealing layer on the side of the foil or film that is to face the interior of the container in order to tightly seal the sealing disk on the orifice of the container, having weakness lines in the sealing layer for forming a removal opening after pulling off the foil or film for the inductive coupling of heat.

Containers serve for receiving contents, for example, for holding beverages or powder-form food products or other substances. Containers have an opening or an orifice on their upper side. It is frequently desired or even necessary to close this container orifice with a disk-shaped seal, which tightly seals the content against external influences, namely a sealing disk.

Sealing disks for sealing a cup are known from WO 2008/006123 A1 and WO 2009/155630 A2. These sealing disks can be fastened by induction sealing onto the upper edge of a cup. For this purpose, the sealing disks have an aluminum foil. A very thin plastic film is introduced on the underside of the aluminum foil, thus on the side adjacent to the contents of the cup.

It is now possible to solidly introduce this film on the upper edge of a cup by means of induction sealing. If an eddy current is induced into the aluminum foil from above, it is correspondingly heated, and the plastic film found under it is also heated. Likewise, the upper edge of the cup, preferably a plastic cup, is also heated. A relatively solid connection of the plastic film to the upper edge of the cup is formed.

The user can then pull off the aluminum foil as needed, which is easily detached from the cup, and then only the very thin plastic film remains on it. This very thin plastic film can be provided with a recess or a weak spot in a targeted manner by thermal action or by a laser cut. A limited removal opening or drink opening can be produced in a targeted manner by means of this recess or weak spot, and the user can obtain a metered withdrawal of the contents of the cup by means of this opening.

In this way, the circumstance can be avoided in which the user removes too large a quantity, which he does not want, at one time from the container, which is particularly not wanted when drinking liquids packaged in this way; likewise, this circumstance occurs when pouring such liquids from large containers, which can gush out under certain circumstances, which is also not desired. This circumstance can be avoided by the targeted provision of small and limited, as well as crisply defined removal openings.

BACKGROUND OF THE INVENTION

Even with this very appropriate and useful proposal, of course, the problem still remains that after the protective aluminum layer has been pulled off, an immediate consumption must occur, in particular for sensitive filling contents, since oxygen can immediately reach the filling contents inside the container through the removal opening or drink opening.

The object of the invention, in contrast to this, is to propose a possibility with which a closure of a container will be possible that simultaneously has all of these advantages: It will be induction-sealable; it will have a defined removal opening; and it will offer the possibility of enabling a longer storage time even after the container has been opened by the end user.

SUMMARY OF THE INVENTION

This object will be achieved according to the invention in the case of a sealing disk of this type in that one or more layers which are connected detachably to the foil or film are provided on the side of the foil or film facing away from the sealing layer, in that during the opening process, the layers on the side facing away from the sealing layer detach more easily from the foil or film than does the sealing layer from the foil or film, in that during the opening process, the layers on the side facing away from the sealing layer detach more easily from the foil or film than does the sealing layer from the orifice of the container, and in that the layers are formed so that they tightly close the removal opening after the foil or film has been pulled off and the layers are again placed on the sealing layer.

The object is achieved without problem with this type of construction. By means of the metal layer and the sealing layer lying on the metal layer adjacent to the inside of the container, an induction sealing of the entire construction on the orifice of the container is possible.

Due to the weakness lines introduced beforehand, when the metal foil is pulled off, removal openings are formed, since the regions of the sealing layer are broken inside the weakness lines and are pulled off with the metal foil.

Due to the layers, in particular the support layer, which remains in the screw cap upon unscrewing, a re-sealability is possible namely by again screwing the screw cap onto the orifice after the removal of a desired amount of the filling contents through the removal openings. The support layer then closes the removal openings, since it lies flat and firmly on top of the remaining sealing layer. Due to this seal, it is impossible for oxygen and miscellaneous foreign particles from the environment to gain access through the removal openings into the inside of the container and to influence the stability therein. Likewise, it is not possible for the remaining filling contents in the interior of the container to unintentionally pass through the removal openings into the surroundings. Also, aroma that often evolves with liquid and even powder-form filling contents and is found above the filling contents does not leak out from the removal openings, but remains in the interior of the container and can thus be perceived as pleasant by the user when the container is next opened by unscrewing the screw cap, and gives the impression of freshness just as it did previously.

This process can be repeated many times if the filling contents in the container are to be consumed in several portions sequentially. Although the stability does not reach the values that it reached in the case of an original induction-sealed closure with the sealing disk, excellent stability times can be achieved.

Due to the design according to the invention, yet additional advantages will be achieved that are not directly stated in the above object by the person skilled in the art, but which are not achievable with the known and otherwise well-functioning designs from WO 2008/006123 A1 and WO 2009/155630 A2. The entire sealing disk is essentially easier to process due to the provision of the support layer or the so-called reseal portion. The sealing disk composed of the metal foil and the sealing layer introduced thereon is so thin that it is poorly processable and above all is very poorly manipulatable. It tends toward buckling in manipulating machines and can also become wrinkled under certain circumstances.

If one attempts to make thicker this sealing disk composed of the metal foil and the sealing layer by making the metal foil thicker, then the material consumption of the relatively expensive metal foil immediately increases enormously without resulting in any other advantage or benefit.

In contrast, the support layer of the invention can be produced from a comparatively inexpensive material that is nevertheless exactly what is wanted.

The overall construction can thus be clearly better handled, a handling by machine being primarily intended here. The sealing disk can be easily transported, easily placed in screw caps, and also otherwise is easy to handle.

Another great advantage arises thereby. The entire sealing disk, thus composed of the support layer or the reseal portion and the metal foil together with the sealing layer and introduced weakness lines can already be placed in the screw cap by the screw-cap manufacturer. The complete screw cap with the already inserted sealing disk is then supplied to the product bottler.

This product bottler need no longer take care of the entire production and assembly of the individual layers, since he only needs to undertake in appropriate machines a closure by screwing-on of the screw caps and the subsequent sealing of the sealing disk that has been screwed on with the screw cap on the container orifice. This also particularly means that this mechanical task can be separated in space and time from the bottling of the filling contents, so that in particular, the especially important rules and restraints to be observed in the treatment of food products and beverages can also be fulfilled without problem, since all machine assembly steps have been completed elsewhere.

Another advantage consists of the fact that in the case of closure by screwing on the screw caps with the sealing disk according to the invention, no appreciable contact pressure need be provided; this is quite different than for sealing disks that are sealed by conduction (instead of induction). For the contact pressure, the support layer with its elasticity is provided without anything further, this layer being able to be easily pressed together with the screwing on of the screw cap, thus when closing the container, and thus the necessary contact force is exercised.

In addition to this, an equilibration of the manufacturing tolerances of the container orifice is also possible by means of the screw cap. The equilibration is also supported by the elasticity of the support layer. The tightness that is achieved with the sealing disk is also further optimized by this equilibration of the orifice tolerances.

The separation behavior according to the invention of the different layers and layer packets from one another can be achieved by suitable adjustment of the adhesive materials lying between the layers, for example by employing adhesive layers or wax layers. These can be adjusted in a targeted way so that certain layers or layer packets detach from one another with the exercise of smaller forces than do other layers.

It is assured that the sealing layer still remains on the container orifice, while the foil or film has already been separated from the sealing layer and likewise, the support layers also have already been separated from the foil or film.

Apart from these mechanical separating forces, it is also possible to achieve or to influence these effects by an appropriate thermal treatment after filling and closing the container. The advantageous common handling of the sealing disk when placing it in a screw cap and when closing the container can be assured in this way, whereby then, by heating subsequent to this process, for example, a wax layer can be melted down in a targeted manner, so that corresponding layers are separated. This separation particularly involves layers on the side of the foil or film facing away from the container orifice, these layers later forming the so-called re-seal portion, and the foil or film itself. For unscrewing the container, in general no force then needs to be applied by the end user in order to separate these two layer packets from one another.

In other cases, this lack of force might not be wanted, so that the end user can still recognize that he is the first to open the closure. It is thus possible to fulfill both of these opposing desires in different embodiments of the invention.

Another possibility arises due to the fact that a foam layer solidly joined with the foil or film is provided between the layers on the side of the foil or film facing away from the sealing layer and the foil or film.

By means of providing such an additional foam layer, orifice tolerances of the container orifice and the cover can be even better equilibrated.

Additional properties are also adjustable by means of such a foam layer. Thus, the foil or film can be formed stiffer and then clamped solidly in a screw closure, which is desired under certain circumstances.

A heat barrier can also be constructed by means of such a foam layer; therefore, the heat induced in the metal foil during the induction does not reach into the upper part of the screw cap.

The metal foil and the entire sealing disk are also resistant to tearing due to the foam layer and can thus also better withstand other requirements for the closing process or for other manipulating procedures.

Finally, by providing such a foam layer, it can also be achieved that the foam layer is furnished with an outwardly projecting gripping tab or with an upwardly projecting gripping tab.

There are different proposals for such gripping tabs, as explained, for example, in EP 1 181 217 B1 or in EP 0 717 710 B1 for an upwardly projecting gripping tab. The gripping tab is thus found on the side of the sealing disk facing away from the interior of the container, for example as a foam layer laid in folds or also as a partially foldable foam layer.

Outwardly directed gripping tabs are known, for example, from EP 0 697 345 B1 or EP 0 668 221 B1. Here, a gripping tab projects outwardly over the peripheral edge of a usually round sealing disk.

Both types of gripping tabs can be easily gripped by the hand of the user during the container opening process, whereby the joint pulling off of the foam layer and the layer joined to it is possible, the layer particularly being a metal foil in the sense of the present invention.

In this way, the opening of the container can be designed in a practicable and user-friendly way for the user also, since he can then simply pull off the metal foil by means of this tab.

Additional preferred features of the invention are indicated in the subclaims.

DESCRIPTION OF THE DRAWINGS

An example of embodiment of the invention will be described in more detail below on the basis of the drawing. Herein.

DETAILED DESCRIPTION

Figure 1:
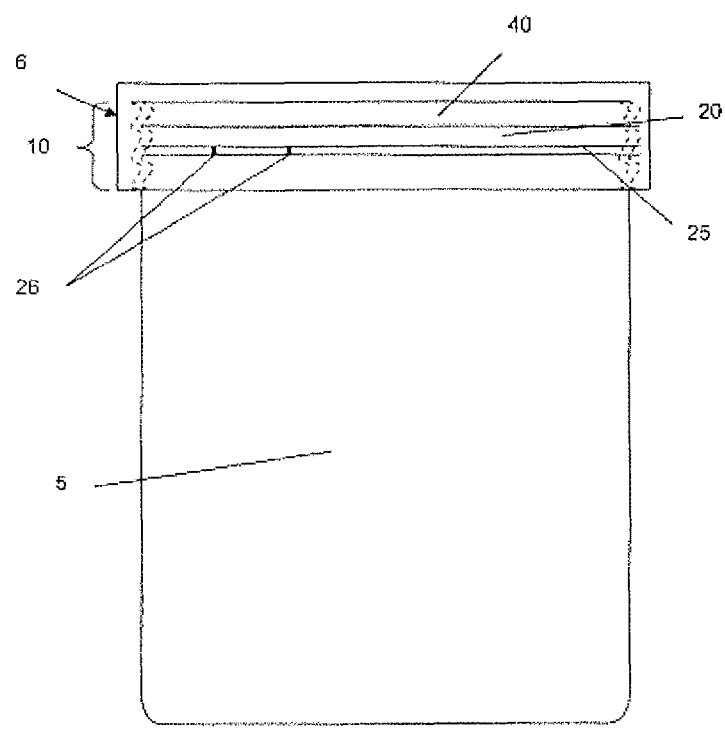
FIG. 1 shows a section through a container with the sealing disk according to the invention.

In the arrangement shown in FIG. 1 of a container 5 with a screw cap 6 and a sealing disk 10 placed between the orifice of the container 5 and the screw cap 6, it can be recognized that several layers or films are disposed one above another for this sealing disk 10. The complete sealing disk 10 is introduced on the edge of a container 5, of which, in particular, the upper orifice is found indicated schematically in the section.

The container 5 can have very different forms and is filled (not shown), for example, with a beverage or with a powder-form food product or similar substances.

Figure 2:
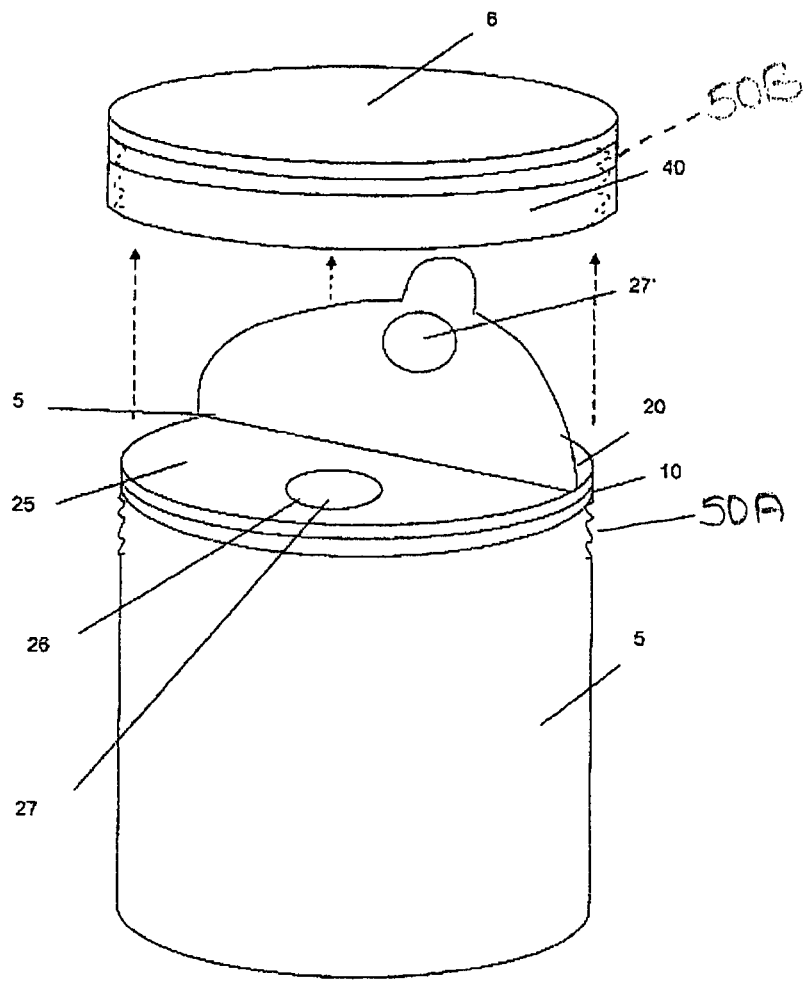
FIG. 2 shows a perspective representation of a container with an opening.

The container 5 is closed with a screw cap 6, which is also indicated schematically. Refer in FIG. 2 to the container 5 and cap screw 6 and respective screw threads 50A and 50B. Prior to the initial opening, the screw cap 6 is solidly screwed on. With the initial opening, the screw cap 6 is removed for the first time by the end user. For this purpose, he rotates the screw cap and removes it from the container 5.

As a central element, the sealing disk 10 in the invention has a foil or film 20 for the inductive coupling of heat into the sealing disk 10. This foil or film 20 is composed of an electrically conductive material, particularly a metal, usually aluminum.

This foil 20 is provided with a sealing layer 25 on the side facing the orifice of the container 5. The sealing layer 25 is provided with weakness lines 26 by application of a laser beam or also thermally or in another manner.

In addition, another support layer 40 is found on the side of the foil 20 facing away from the sealing layer 25. The support layer 40 is composed of a plastic. It is appropriately flexible in order to be able to equilibrate certain non-uniformities. This support layer 40 is combined with the foil 20 by a layer of adhesive, which is less firm and has less adhesion than the joining between sealing layer and aluminum layer or also than other layers of the invention, with which the aluminum layer can be furnished on its upper side, for example a printed layer for labels or advertising.

The adhesive layer between the support layer 40 and the foil 20 can also be stripped off or removed by thermal treatment by the manufacturer. This can be carried out, for example in the case of a wax layer as the adhesive layer, by heating after filling and closing the container 5, so that the wax melts and is treated so that when it is cool again, it does not produce a joining of the support layer 40 with the foil 20. From the view of the end user, when opening, hardly any force is then necessary for breaking the connection between support layer 40 and foil 20, since these only lie loosely on one another at this moment, without anything further.

It is preferred here, of course, to still maintain a slight adhesion in order to make possible an originality check by the end user, to indicate to him, by means of the force necessary for loosening, that he is the first to open the screw cap. For certain cases of application, however, this might not be necessary or desired; this circumstance can be assured in this way by a suitable selection of the adhesive layer between the support layer 40 and the foil 20.

After filling the container 5 with filling contents, the entire sealing disk 10 is applied onto the container orifice or placed there. Then heat is inductively coupled into the sealing disk 10 and thus particularly also into the foil 20. This heat causes the sealing layer 25 to melt, in particular where the sealing layer 25 is applied directly onto the edge of the orifice of the container 5.

This orifice of the container 5 is also heated thereby.

The sealing layer 25 is thus joined firmly in this region with the upper edge of the container 5. It is assuredly sealed.

Finally, the screw cap 6 is placed over this region when closing the container and thus holds the entire sealing disk composed of sealing layer 25, foil 20 for coupling of heat, adhesive layer and support layer 40 additionally firmly onto the container.

With the initial opening, the screw cap 6 will now be removed for the first time. The end user thus unscrews the container. In this way, the support layer 40 together with the screw cap 6 is loosened from the cup 5 with sealing layer 25 and foil 20 remaining thereon, since, as mentioned, the adhesive layer between the foil 20 and the support layer 40 is the weakest joining element.

The end user now observes the top side of the foil 20 lying in front of him, possibly with advertising introduced thereon or also useful hints to him as the end user referring to the further recommended procedure for opening the container and for closing it again.

He can pull off this foil, for example via a tab, with which this foil can be gripped.

If he pulls this foil 20 off, then the sealing layer 25 still remains on the container.

Of course, in this pulling-off procedure, those regions of the sealing layer 25, which are edged with the weakness lines 26, are lifted up with it. The weakness lines 26 are weaker than the forces that hold the foil 20 on the sealing layer 25 and the edge of the orifice of the container 5 and are therefore jointly separated with the foil 20 from the cup 5, the sealing layer 25 remaining thereon.

Now, however, this leads to the circumstance that "holes", namely removal openings 27, form in the sealing layer 25 remaining on the edge of the orifice of the cup 5. That part of the sealing layer 25 within a circular weakness line 26, for example, consequently remains on the pulled-off foil 20 and is lifted with it, which is indicated by the reference number 27.

It is thus possible to remove the content of the cup or container 5 through these removal openings 27, although the sealing layer 25 still seals the container.

By means of an appropriate arrangement of these removal openings 27 adjacent to the edge of the container 5, openings for drinking can be created in this way if the container 5 is used for beverages.

Now, however, the possibility exists, if the user would like to save the rest of the filling contents for a later time after the removal of a certain portion of the filling contents, to again screw the screw cap 6 onto the container. The support layer 40 is still found in the screw cap. This support layer 40 covers the entire surface and is now again applied onto the top side of the orifice upon screwing on the screw cap 6. Now, of course, the previously present foil 20 is missing. Instead of this, the support layer 40 is now applied onto the top side of the sealing layer 25 and simultaneously closes the removal openings 27 in this way. The filling contents in the container 5, which could leak out from the removal openings 27, for example, with an oblique positioning or a shaking of the container 5, are now hindered by the support layer 40.

Likewise, it is also no longer possible that oxygen or possibly foreign objects from outside can enter into the filling contents in the interior of the container 5 through these removal openings 27. They are hindered thereby purely mechanically by the screw cap and by the two layers tightly applied on top of one another, namely the sealing layer 25 and the support layer 40, between which they cannot diffuse inside.

Of course, this closure is not as tight and permanent as the original closure with the induction-sealed arrangement composed of the foil 20 with the sealing layer 25 that was still not broken at the weakness lines 26, although it is in a position, however, to protect the filling contents in the interior of the container 5 against external influences and thus an oxidation and, in particular, to prevent accidentally pouring out the contents, for an appropriately reliable and longer period of time.

LIST OF REFERENCE NUMBERS

5 Container
6 Screw cap
10 Sealing disk
20 Foil or film
25 Sealing layer
26 Weakness lines
27 Removal openings
27' Lifted-off region of the sealing layer 25 inside the weakness line 26
40 Support layer

I claim:

1. A sealing disk for placement in a screw cap, for closing an orifice of a container and having respective opening and closed positions relative to the container, said sealing disk comprising:
    a heat induction layer comprised of one of a metal foil and a metal film for the inductive coupling of heat into the sealing disk,
    a sealing layer that is attached on the side of the heat induction layer that faces the interior of the container in order to tightly seal the sealing disk on the orifice of the container,
    said sealing layer having weakness lines in the sealing layer for forming a removal opening in the sealing layer after pulling off the heat induction layer,
    at least a support layer connected detachably to the heat induction layer on the side of the heat induction layer facing away from the sealing layer,
    said support layer, during opening of the sealing disk, detaching more easily from the heat induction layer than the sealing layer detaches from the heat induction layer,
    said support layer, during opening of the sealing disk, detaching more easily from the heat induction layer than the sealing layer detaches from the orifice of the container, and
    said support layer, in the closed position of the sealing disk being formed so as to tightly close the removal opening wherein the support layer is threaded onto the container by means of respective screw threads associated with the support layer and the container, after the heat induction layer has been pulled off and the support layer is again placed on the sealing layer.

2. The sealing disk according to claim 1, further characterized
in that the metal foil is an aluminum foil and the metal film is an aluminum film.

3. The sealing disk according to claim 1, further characterized
in that the support layer includes a foamed polymer or cardboard.

4. The sealing disk according to claim 1, further characterized
in that on the side of the heat induction layer facing away from the sealing layer, the support layer already detached by the manufacturer by means of thermal action from the heat induction layer.

5. The sealing disk according to claim 1, further characterized
in that a foam layer firmly joined with the heat induction layer is provided between the support layer on the side of the heat induction layer facing away from the sealing layer and the heat induction layer.

6. The sealing disk according to claim 5, further characterized
in that the foam layer is furnished with an outwardly projecting gripping tab or with an upwardly projecting gripping tab.

7. The sealing disk according to claim 1, further characterized
in that the sealing layer is attached to the heat induction layer by a first adhesive.

8. The sealing disk according to claim 7, further characterized
in that the support layer is connected to the heat induction layer by a second adhesive, and the first adhesive provides a more firm attachment than the second adhesive so that, as the sealing disk is opened, the support layer detaches from the heat induction layer while the sealing layer remains attached with the heat induction layer.

9. The sealing disk according to claim 1, further characterized
in that the support layer, in the closed position, is constructed and arranged to be congruent with the sealing layer so that the support layer covers and seals with both the sealing layer and the removal opening.

10. The sealing disk according to claim 9, further characterized
in that the support layer is comprised of a foamed polymer or of cardboard.

11. The sealing disk according to claim 9, further characterized
in that the sealing disk is opened by unscrewing the screw cap to separate the support layer from the heat induction layer.

12. The sealing disk according to claim 11, further characterized
in that the sealing layer, during the opening of the sealing disk, remains on the orifice of the container as the heat induction layer is pulled off the sealing layer.

13. The sealing disk according to claim 12, further characterized
in that the weakness lines form a closed area that is to be removed.

14. The sealing disk according to claim 13, further characterized
in that the closed area formed by the weakness lines is lifted from the sealing layer.

15. The sealing disk according to claim 14, further characterized
in that the closed area formed by the weakness lines remains on the heat induction layer during the opening of the sealing disk.

16. The sealing disk according to claim 15, further characterized
in that the sealing layer is attached to the heat induction layer by a first adhesive, the support layer is connected to the heat induction layer by a second adhesive, and the first adhesive provides a more firm attachment than the second adhesive so that, as the sealing disk is opened, the support layer detaches from the heat induction layer while the sealing layer remains attached with the heat induction layer.

17. A sealing disk for closing an orifice of a container and having respective opening and closed positions relative to the container, said sealing disk comprising:

a heat induction layer comprised of one of a metal foil and a metal film for the inductive coupling of heat into the sealing disk;

a sealing layer that is attached on a side of the heat induction layer that faces the interior of the container in order to tightly seal the sealing disk on the orifice of the container by virtue of excitation of the heat induction layer to adhere the sealing layer to the orifice of the container;

said sealing layer having a closed weakness line disposed in the sealing layer for forming a removal opening upon pulling off the heat induction layer relative to the sealing layer;

a support layer connected to the heat induction layer on the side of the heat induction layer facing away from the sealing layer;

wherein the container has a screw cap for holding the support layer;

said sealing layer being attached to the heat induction layer by a first adhesive interface;

said support layer being connected to the heat induction layer by a second adhesive interface, and the first adhesive interface provides a more firm attachment than the second adhesive interface so that, as the sealing disk is opened, the support layer detaches from the heat induction layer while the sealing layer remains attached with the heat induction layer;

said support layer, in the closed position of the sealing disk being formed so as to tightly close the removal opening after the heat induction layer has been pulled off and the support layer is placed on the sealing layer;

wherein, in the closed position of the sealing disk, the support layer is re-sealed with the sealing layer by means of the support layer being threaded onto the container by means of respective screw threads associated with the support layer and the container so that the support layer lies flat and firmly on top of both the remaining sealing layer and the removal opening.

18. The sealing disk according to claim 17, further characterized in that the sealing layer is attached to the heat induction layer by a first adhesive; and in that the support layer is connected to the heat induction layer by a second adhesive, and the first adhesive provides a more firm attachment than the second adhesive so that, as the sealing disk is opened, the support layer detaches from the heat induction layer while the sealing layer remains attached with the heat induction layer.

19. The sealing disk according to claim 18, further characterized in that the sealing disk is opened by unscrewing the screw cap to separate the support layer from the heat induction layer;

in that the sealing layer, during the opening of the sealing disk, remains on the orifice of the container as the heat induction layer is pulled off the sealing layer;

in that the weakness lines form a closed area that is to be removed;

in that the closed area formed by the weakness lines is lifted from the sealing layer; and in that the closed area formed by the weakness lines remains on the heat induction layer during the opening of the sealing disk.

20. The sealing disk according to claim 17 wherein the support layer is constructed to have a flat sealing contact surface so that, when the support layer is re-sealed with the sealing layer, the flat sealing contact surface lies flat and firmly on top of both the remaining sealing layer and the removal opening.

21. The sealing disk according to claim 20 wherein the support layer, in the closed position, is constructed and arranged to be congruent with the sealing layer so that the support layer covers and seals with both the sealing layer and the removal opening.

22. A method of applying a sealing disk for closing an orifice of a container, said method comprising:

providing a screw can for sealing the container;

providing a heat induction layer comprised of one of a metal foil and a metal film for the inductive coupling of heat into the sealing disk;

attaching a sealing layer on a side of the heat induction layer that faces the interior of the container in order to tightly seal the sealing disk on the orifice of the container;

exciting the heat induction layer to adhere the sealing layer to the orifice of the container;

connecting a support layer to the heat induction layer on the side of the heat induction layer facing away from the sealing layer;

said sealing layer having a weakness line forming a closed area disposed in the sealing layer for forming a removal opening;

pulling off the heat induction layer and the closed area of the sealing layer relative to the sealing layer to expose the removal opening;

closing the sealing disk after removing the heat induction layer by placing the support layer on the sealing layer to cover and close the removal opening to prevent any leak out through the removal opening;

wherein the step of closing the sealing disk includes screwing the screw cap onto the container by means of respective screw threads associated with the screw cap and the container so as to re-seal with both the remaining sealing layer and the removal opening.

23. The method according to claim 22 including constructing the support layer to have a flat sealing contact surface so that, when the support layer is re-sealed with the sealing layer, the flat sealing contact surface lies flat and firmly on top of both the remaining sealing layer and the removal opening.

* * * * *